Jan. 10, 1928.  1,655,832
D. L. BENTON
COMBINED TRUNK RACK AND BUMPER
Filed Oct. 16, 1926  2 Sheets-Sheet 1
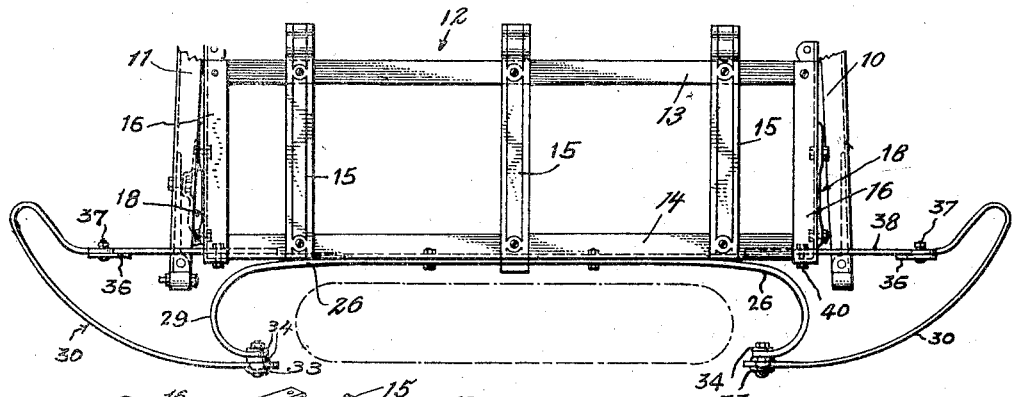
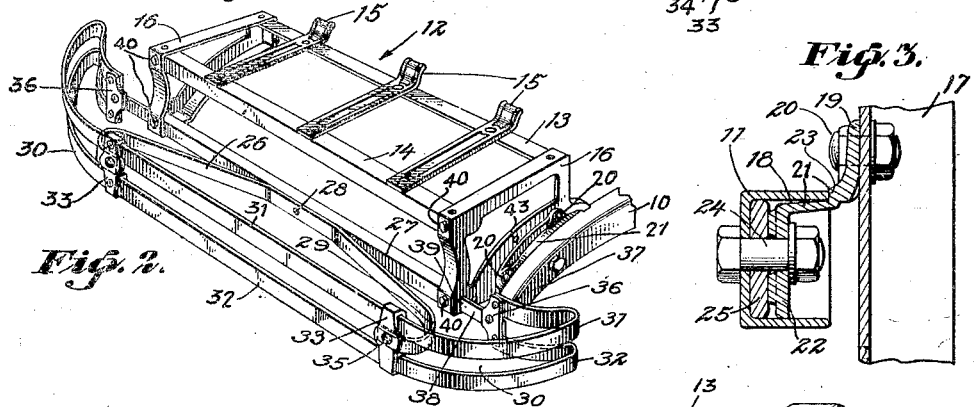
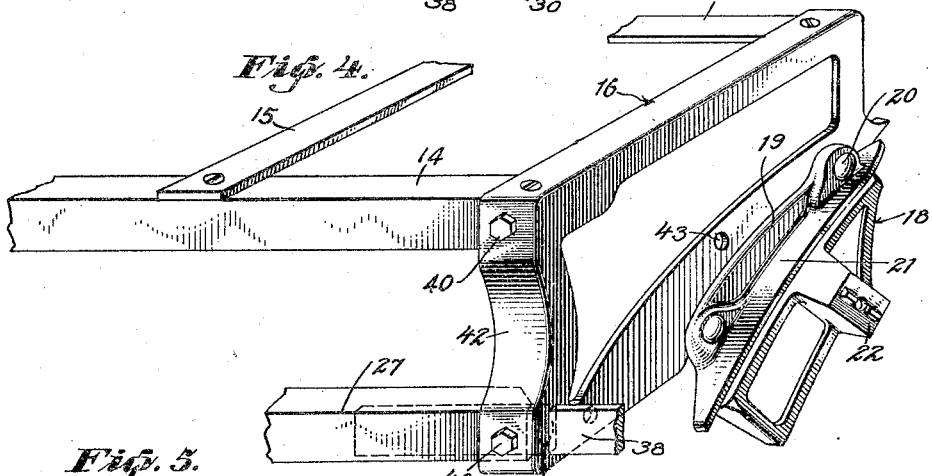
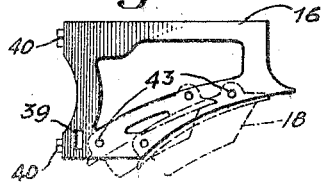
INVENTOR.
Donald L. Benton
BY
Townsend, Loftus & Abbett
ATTORNEYS.

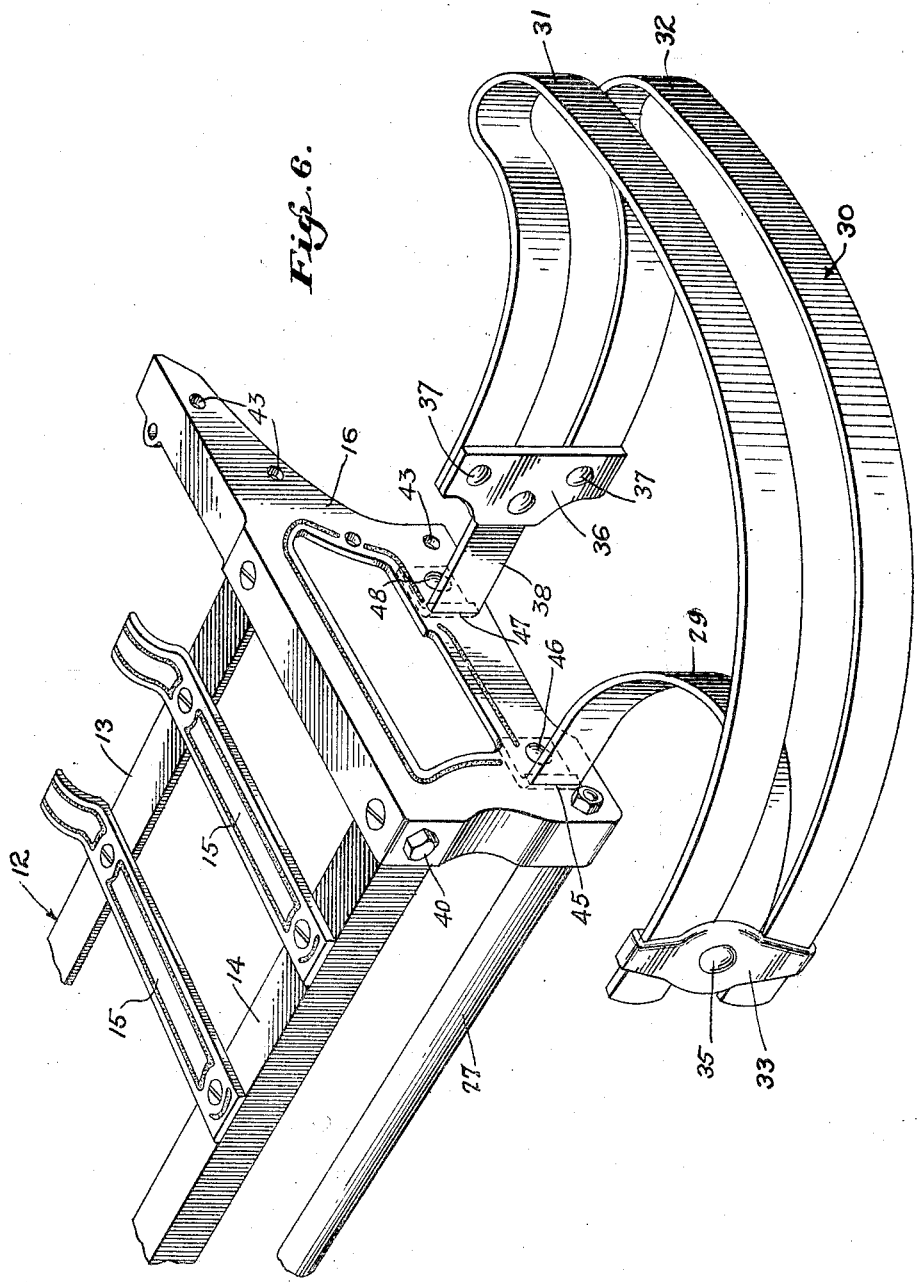

Patented Jan. 10, 1928.

1,655,832

UNITED STATES PATENT OFFICE.

DONALD L. BENTON, OF LOS ANGELES, CALIFORNIA, ASSIGNOR TO AMERICAN CHAIN COMPANY, INC., OF BRIDGEPORT, CONNECTICUT, A CORPORATION OF NEW YORK.

COMBINED TRUNK RACK AND BUMPER.

Application filed October 16, 1926. Serial No. 141,928.

This invention relates to automobile accessories, and particularly pertains to the construction of a combined trunk rack and bumper. At the present time there is a growing demand for a trunk rack which may be conveniently fitted to the frame at the rear of an automobile and which rack may be adapted for application to cars of varying design and make. It is also desirable to protect the rear of the vehicle by a bumper, preferably of the spring bar type; and it is the principal object of the present invention to provide a trunk rack structure universally adaptable to the frame of a number of makes of automobiles, and which structure will satisfactorily support a protecting bumper for the rear of the car.

The present invention contemplates the use of a rigid trunk rack frame to which are applied adjustable frame fittings and which frame furthermore provides a suitable support for a resilient bumper carried at the rear of the vehicle.

The invention is illustrated by way of example in the accompanying drawings, in which—

Figure 1 is a fragmentary view in plan, showing the trunk rack with which the present invention is concerned, and further disclosing the manner in which a bumper is carried thereby;

Fig. 2 is a view in perspective, showing the trunk rack as applied to the vehicle frame;

Fig. 3 is an enlarged fragmentary view in transverse section through the trunk rack structure and the frame, showing the universal fitting and its application to the frame;

Fig. 4 is an enlarged fragmentary view in perspective showing the application of the universal fitting to the trunk rack;

Fig. 5 is a view in end elevation, indicating in dotted lines the two positions which may be assumed by the universal fitting.

Fig. 6 is a fragmentary view in perspective showing a form of the invention in which the bumper structure is in two separate units.

Referring more particularly to the drawing, 10 and 11 indicate the side frame members of an automobile. It is the trend of automobile design at the present time to permit these frame members to extend beyond the back of the automobile body, thus providing a space which will accommodate a trunk rack 12. The trunk rack may be of any preferred design, but in this particular case is shown as comprising parallel frame members 13 and 14 disposed in the same horizontal plane and connected by a plurality of lateral slats 15 which form the supporting platform for the parcels or luggage to be carried. The frame members 13 and 14 extend transversely of the vehicle frame and are secured at their ends within end castings 16. These castings are in duplicate and are designed to be attached to the rear frame horns of the vehicle frame members 10 and 11. The frame castings 16 have portions which extend downwardly along the inner faces of the vehicle side frame members and extend a sufficient distance rearwardly to clear the gasoline tank or any parts of the vehicle structure which might be disposed between the vehicle frame members. One feature of the present invention is the manner in which the castings 16 of the trunk rack may be securely connected with frame horns of varying configuration and length, this being a condition which arises in connection with different makes of automobiles now on the market. The universal adaptability of the trunk rack castings 16 is effected by frame fittings 18 indicated in perspective in Fig. 4 of the drawing, and further indicated in Figs. 3 and 5. These fittings have a flange 19 which lies flat against the faces of the trunk rack castings 16 and may be bolted or riveted in position by bolts 20 passing through bolting pads on the flanges 19 and through openings in the trunk rack castings 16. A substantially horizontally extending portion 21 is formed integrally with the flange 19 of the fitting 18. This horizontal portion is arcuate in formation when considered longitudinally of the fitting, and is adapted to fit within and conform to the contour of the upper flange of the vehicle side frame members as indicated in Fig. 3 of the drawing. A vertical filler plate is formed integrally with the horizontal flange 21 and extends parallel to the vertical portion of the channel section of the vertical side frame member as indicated at 22 in Fig. 3. The lower edge of the filler plate conforms in contour with the lower arm of the channel frame section and is intended to co-operate with the horizontal flange 21 to wedge the fitting 18 into position between the arms of the channel section of the frame. Attention is directed to the fact that in Fig. 3 of the drawing the flange 21 is shown as being formed with a slightly inclined outer face which causes the fitting to be wedged between the arms of the channel section as the fitting is drawn into position and the channel is caused to strike the shoulder 23 by the clamping action of the bolt 24. Interposed between the face of the filler plate 22 and the vertical portion of the frame channel is a resilient packing member 25 such as a rubber block which co-operates in holding the fittings rigidly and preventing them from rattling. By reference to Fig. 5 of the drawing it will be seen that the fitting 18 may be shifted in position with relation to the end castings of the trunk rack structure. This makes it possible to adapt the trunk rack to frame horns varying in design, while at the same time maintaining the platform of the trunk rack in a horizontally aligned supporting position. It will be evident that by mounting the trunk rack between the channel frame elements 10 and 11 in the manner previously described, the trunk rack will be rigidly held. It is desirable, therefore, to mount a resilient bumper structure upon this rigid rack, whereby the bumper will be properly supported and the rear of the vehicle will be adequately protected.

As shown in Figs. 1 and 2 of the drawing, a bumper structure is provided which will accommodate a spare tire supported from the trunk rack at the rear and center thereof. This bumper comprises a back bar 26 which is secured to a connecting element 27. This connecting element is rigidly fastened to the lower corners of the trunk rack frame castings 16, and tends to give rigidity to the trunk rack structure. The resilient back bar of the bumper extends outwardly from its point of connection at 28 and assumes an angle with relation to the transverse member 27 of the trunk rack. The opposite ends of this bar terminate in loops 29 formed when the bar is bent upon itself, so that its terminating ends are extending inwardly toward each other. Supported upon these terminating ends of the back bar are resilient fender protectors 30, here shown as formed by the use of vertically spaced parallel loops of flat resilient material, as indicated at 31 and 32. The rear ends of these loops terminate upon opposite sides of the ends of the back bar 26 and are there fastened by complementary clamp plates 33 and 34 which are held upon opposite sides of the members 31 and 32 and are at the same time secured to the ends of the back bars 26 by bolts 35. The loop portions overhang the sides of the vehicle to protect the fenders and the forward terminating ends of the strips 31 and 32 are secured to a T-shaped fitting 36 by rivets 37.

Secured to this casting and in the space between the members 31 and 32, is a resilient supporting bar 38 which passes through an opening 39 in the end castings of the trunk rack and conforms to the inner face of the transverse trunk rack member 27. This trunk rack member as shown in Figs. 1, 2 and 4 is of channel or angle section, so that the supporting bar 38 may be aligned with the inner faces of the member 27, and will be rigidly held in such aligned position by a bolt 40 which passes through the end flange 42 of the trunk rack castings 16 and also holds the transverse bar 27 with relation thereto.

It will be seen that by thus supporting the members 38 from the rigid trunk rack structure, the resilient bumper will be properly held and will be capable of deflection in all directions in a horizontal plane without undue stress upon any parts of the bumper structure or any parts of the structure by which it is secured to the vehicle.

It will be understood that when desired, the members 31 and 32 forming the fender protectors may extend completely across the rear of the vehicle, as indicated in Fig. 2 of the drawing, without departing from the spirit of the invention. The structure, however, described embodying the use of fender protectors, is intended for the accommodation of a spare tire which is carried in the rear of the vehicle.

Referring particularly to Fig. 6 of the drawing, it will be seen that a separate bumper wing or tip 30 is secured at the end of the trunk rack and it is to be understood that a duplicate bumper structure is secured at the opposite end of the trunk rack, not shown. The looped portion 29 does not continue as a part of the bar 26 shown in Figs. 1 and 2 of the drawings, but is cut off and is passed through an opening 45 in the end casting 16. The terminating end of the looped member 29 is bent rearwardly and is secured to the casting by a suitable rivet or bolt 46. As previously described, the bars 31 and 32 forming the bumper tip are suitably secured to a cross plate 36, which plate is in turn attached to a resilient bar 38. In the present instance, however, this bar passes through an opening 47 in the plate 16 and is secured by a bolt or rivet 48.

In operation of the present invention the trunk rack structure comprising transverse bars 13, 14, and 27, is secured within the trunk rack castings 16 by bolts 40. The fittings 18 may then be secured within the frame channels 10 and 11 by the bolts 24, after which the assembled trunk rack may be positioned between the vertically extending flanges 19, adjusted with relation to the bolting pads thereof so that the openings in said pads will suitably register with holes 43 in the end castings 16. It will be understood that the object of this adjustment is to mount the trunk rack structures so that the supporting platform will be horizontally aligned. After the bolt holes have been selected, the trunk rack may be bolted in the chosen position, as indicated by dotted lines in Fig. 5 of the drawing. The bumper may then be assembled on the rack; or if convenience dictates, it may be assembled prior to mounting the rack upon the vehicle.

It will thus be seen that the device here disclosed comprises a rigid trunk rack structure which may be conveniently secured to vehicle frames of varying design and upon which structure a resilient bumper may be suitably supported.

While I have shown the preferred form of my invention as now known to me, it will be understood that various changes might be made in the combination, construction, and arrangement of parts, by those skilled in the art, without departing from the spirit of the invention as claimed.

Having thus described my invention, what I claim as new and desire to secure by Letters Patent is:

1. A combined trunk rack and bumper comprising end frame members, means rigidly connecting the same for forming a load-supporting platform, adjustable means adapted to be fastened to the end frame members, whereby they will be rigidly secured to the frame of an automobile and the loading platform will be disposed in a horizontally aligned position, a spring bar bumper disposed with its impact section extending transversely of the rear of the trunk rack, and means for supporting said impact section from the end frame members of the trunk rack.

2. A combined trunk rack and bumper comprising a pair of end frame members, means connecting said members and forming a load-supporting platform, a spring bar bumper extending transversely of the rear of the trunk rack thus formed and capable of yielding horizontally while being substantially rigid vertically, means for attaching said bumper to the trunk rack, and means adjustably attached to the trunk rack frames and the side frame members of the vehicle, whereby the load-supporting platform will be rigidly held in a horizontally aligned position and the bumper will be supported in a substantially horizontal plane.

3. A combined trunk rack and bumper comprising a pair of end frame members, a pair of connecting bars secured to the uppermost corners of said frame members in the same horizontal plane, a third connecting bar secured to the rear lower corner of the frame members and rigidly connecting the same, a resilient bar secured at its center to the center of the lower connecting bar, said bar extending outwardly and rearwardly from the point of connection, an automobile bumper impact section disposed in the rear of said resilient bar and connected therewith at its free ends, said impact section terminating in recurved loops, means for securing the forward ends of said loops to the end frame members of the trunk rack, and adjustable means for securing the assembled structure between the rearwardly projecting frame members on the vehicle, whereby the upper surface of the trunk rack will be disposed in a horizontal plane and the bumper will be disposed in the rear of the rack for the protection of the same.

4. In combination with an automobile frame, a trunk rack comprising a rigid trunk rack structure having vertical ends adapted to fit between the channeled automobile frame members, and fittings conforming to the contour of the channel members and being wedged therein by bolts pasing through them and the channels, and means for securing said members to the end of the trunk rack for the support of the same.

5. In combination with a trunk rack adapted to be secured to the channel frame members of an automobile, fittings adapted to fit between the flanges of the channels and having oppositely inclined edges to cause said fittings to wedge between said flanges, a bolt passing through the fittings and the body of the frame members to hold the fittings in their wedged position, flanges formed on the fittings, and means for securing the trunk rack to said flanges.

6. A trunk rack structure comprising a pair of vertically disposed end brackets, a rigid trunk rack structure supported by and secured between said end brackets and being permanently supported in a substantially horizontal plane and fastening members adjustably conformable to the frame of the vehicle upon which the trunk rack is mounted and adjustably attachable to the end members of the trunk rack structure whereby the trunk rack will be supported in a substantially horizontally aligned position.

7. A trunk rack structure comprising vertically disposed end brackets having an inwardly extending horizontal flange, transverse horizontally extending connecting bars secured by their opposite ends to said flange whereby a rigid bumper trunk rack structure will be provided, means adjustably secured to the end brackets and engageable with the side frame members of the vehicle frame upon which the structure is mounted and means for securing said members to the side frame members whereby a trunk rack structure will be rigidly supported in a substantially horizontally aligned position.

8. A combined trunk rack and bumper comprising a rigid trunk rack platform permanently positioned horizontally of the rear of an automobile frame and resilient bumper structures disposed at the opposite ends of said trunk rack and carried thereby, said bumper structures being in the shape of looped end bumper tips adapted to overhang the frame of the vehicle and protect the fenders thereof, and means for securing said tips to the frame member in a manner to permit them to have horizontal yielding movement.

9. A combined trunk rack and bumper comprising a rigid load supporting platform, end brackets to which said platform is secured, means for securing said end brackets in a mounted position upon the ends of the automobile side frames, and resilient bumper tip structures disposed at opposite ends of the trunk rack and carried thereby, said structures comprising an impact member disposed in a horizontal plane, said member being bent upon itself to form a looped end, the opposite free end of the impact member being resiliently supported from the end brackets of the trunk rack structure.

10. A combined trunk rack and bumper comprising a rigid load supporting platform, end brackets to which said platform is secured, means for securing said end brackets in a mounted position upon the ends of the automobile side frames, resilient bumper tip structures disposed at opposite ends of the trunk rack and carried thereby, said structures comprising an impact member disposed in a horizontal plane, said member being bent upon itself to form a looped end, and resilient mounting members secured to the free ends of the impact member by their outer ends and being rigidly secured to the end brackets of the trunk rack structure and their opposite ends.

11. A combined trunk rack and bumper comprising a rigid load supporting platform, end brackets to which said platform is secured, means for securing said end brackets in a mounted position upon the ends of the automobile side frames, resilient bumper tip structures disposed at opposite ends of the trunk rack and carried thereby, said structures comprising a plurality of flat spring impact bars bent upon themselves to form looped bumper tips, said impact bars being superposed in vertical alignment, means securing the rear free ends of said impact bars together, means for securing the opposite free ends of said impact bars together, and resilient brackets engaging said securing means and resiliently connecting the bumper tip structures with the end brackets of the trunk rack structure.

12. A combined trunk rack and bumper comprising a rigid load supporting platform, end brackets to which said platform is secured, means for securing said end brackets in a mounted position upon the ends of the automobile side frames, resilient bumper tip structures disposed at opposite ends of the trunk rack and carried thereby, said structures comprising a plurality of flat spring impact bars bent upon themselves to form looped bumper tips, said impact bars being superposed in vertical alignment, means securing the rear free ends of said impact bars together, means for securing the opposite free ends of said impact bars together, a U-shaped resilient bracket connecting the rear free ends of the impact structure with the end bracket of the trunk rack, and a resilient bracket connecting the opposite ends of the impact members with the end brackets of the trunk rack.

13. A combined trunk rack and bumper structure comprising a rigid load supporting platform, end brackets to which said platform is secured, means for securing said end brackets in a mounted position upon the ends of an automobile frame, bumper structures disposed at the opposite ends of said trunk rack, said structures comprising resilient impact bars extending from points spaced from and laterally of the trunk rack end brackets at their forward ends to points spaced from and in the rear of the trunk rack structure at their rear ends, whereby the rear fenders of the automobile will be protected by the impact sections thereof and a space will be provided between the rear terminating ends of the impact members for accommodating a spare tire carried by the trunk rack, and means for mounting said bumper structures with relation to the automobile frame.

14. A combined trunk rack and bumper structure comprising a rigid load supporting platform, end brackets to which said platform is secured, means for securing said end brackets in a mounted position upon the ends of an automobile frame, bumper structures disposed at the opposite ends of said trunk rack, said structures comprising resilient impact bars extending from points spaced from and laterally of the trunk rack end brackets at their forward ends to points spaced from and in the rear of the trunk rack structure at their rear ends, whereby the rear fenders of the automobile will be protected by the impact sections thereof and a space will be provided between the rear terminating ends of the impact members for accommodating a spare tire carried by the trunk rack, and mounting means secured to the opposite ends of the impact members of the bumper structures and by which said bumper structures are fixed with relation to the trunk rack and the automobile frame.

15. A combination trunk rack and bumper structure comprising a rigid load supporting platform, means for fastening said platform to the rear of an automobile and in a horizontal plane, said platform being of a width less than the distance between the rear fenders of the vehicle upon which the structure is mounted, bumper structures disposed at the outer ends of said platform and adapted to be mounted in fixed relation thereto, said structures comprising impact bars extending from a point adjacent the outer edge of the automobile fenders to a point in the rear of and spaced from the back face of the trunk rack, means for securing the forward ends of said impact members with relation to the automobile, and means projecting rearwardly at the rear of the load supporting platform for securing the rear ends of the bars with relation thereto.

16. A combined trunk rack and bumper structure comprising a rigid load supporting platform adapted to be disposed transversely of the rear of an automobile and carried thereby, bumper structures disposed at the opposite ends of said load supporting platform for the protection of the fenders thereof, said structures comprising resilient impact bars disposed horizontally and curved rearwardly and inwardly from a point at the side of the vehicle to a point in the rear of the load supporting platform, said rear terminating ends being spaced from the rear face of the load supporting platform a distance sufficient to accommodate a spare tire disposed therebetween, means extending inwardly from the forward ends of said impact bars for securing said ends in fixed relation to the vehicle, and means securing the rear terminating ends of said impact bars to the load supporting platform.

DONALD L. BENTON.